April 16, 1968     F. MOSCARINI     3,377,857
VARIABLE AREA RATE-OF-FLOW METER

Filed Oct. 18, 1965     2 Sheets-Sheet 1

United States Patent Office 3,377,857
Patented Apr. 16, 1968

3,377,857
VARIABLE AREA RATE-OF-FLOW METER
Flaviano Moscarini, 9 Viale Pola, Rome, Italy
Filed Oct. 18, 1965, Ser. No. 497,300
Claims priority, application Italy, Dec. 10, 1964,
26,370/64
3 Claims. (Cl. 73—207)

ABSTRACT OF THE DISCLOSURE

A transducer for metering the instantaneous rate-of-flow of fluids with a broad dynamics of response. A hermetically sealed metal housing has on its lower wall an inlet pipe and an outlet pipe and a barometric bellows having an input opening and an output opening is arranged within said housing. The output opening is rigidly secured to the output pipe and a duct is connected at one end to the inlet opening. A support is screwed to the inner wall of the housing above the bellows and has apertures to allow the fluid passage from the inlet pipe and is provided with a tubular projection having openings at a level corresponding to the upper end of the duct partially entering into the projection. An annular variable inductance transducer is arranged within the tubular projection and an adjusting member is elastically arranged within said inductance transducer to form a choke between said duct and said adjusting member. A screw passes through the upper wall of the housing and acts on said adjusting member, whereby the inner and outer surface of said bellows are submitted to the differential pressure existing upstream and downstream of said choke the aperture of which changes with the deformation of the barometric bellows.

---

Figure 1:
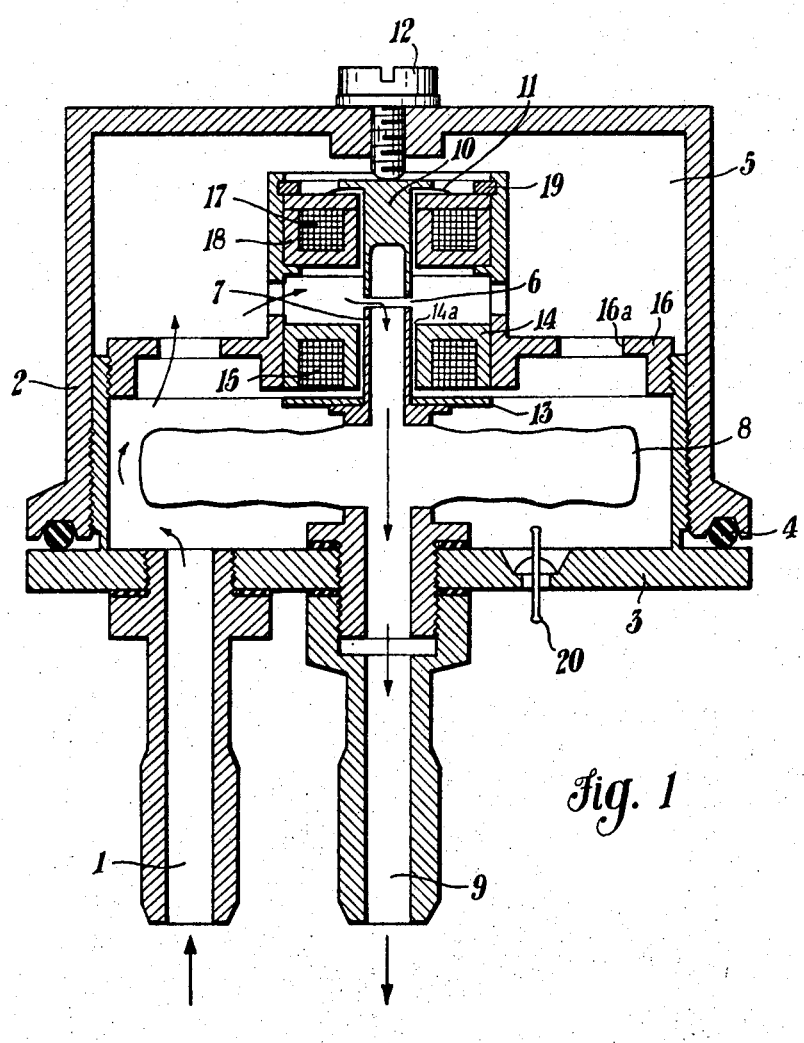

The present invention relates to a transducer for metering the instantaneous flow rate of a fluid, with a broad response dynamics.

Particularly the present invention relates to a device for metering the consumption of a fuel, provided it is either liquid or gaseous, by an internal combustion engine, during the changes of rating or of performance of the engine itself, said changes of rating being either due to changes of load, or imposed to the engine by its control members or due to other reason.

Up to today the metering of the consumptions of the internal combustion engines has been always made in the two fundamental methods of metering at the test bed, or metering "under use at steady rating."

During the metering effected at the test bed, the engine is fed with constant induction, and the fuel consumptions are checked at different steady ratings of different constant speeds obtained by adjusting the load.

In the metering effected under use at "steady rating" the engine is on the contrary mounted on the actual user (vehicle, boat, and so on) and the fuel consumption is metered by reducing the induction so as to obtain the steady ratings at which the consumption metering is to be effected. Practically these two methods allow characteristics of the engine performance to be obtained and its efficiency to be computed, however said characteristics only rarely are coincident with the characteristics, unknown up to now, concerning the practical utilisation of the engines which, particularly when used on automotive vehicles, can be used very rarely at a constant rating.

The device metering the rate-of-flow according to the present invention allows therefore to obviate the drawbacks of the prior art as above cited, since it allows the instantaneous rate-of-flow of the fuel feeding the engine to be metered. The metering device according to this invention allows also, owing to its sensitivity and speed of response, the checking of the hydraulic phenomena concerned with the feeding of the internal combustion engines by means of carburetors and injection pump.

The purpose of the present invention is, accordingly, that of supplying a rate-of-flow meter particularly suitable for the above cited purposes, affording thus a low pressure drop between the inlet and the outlet of the fluid, a minimum meterable rate-of-flow being at least $1/100$ of the maximum rate-of-flow, an error percent constant throughout the range of the metered rate-of-flow, an instrument which is insensible to the changes of temperature and to vibration, and a maximum response speed to the changes of the metered rate-of-flow in order to render possible the analysis of the steady-state and transient phenomena concerned with the feed of the engines.

According to the present invention, the rate-of-flow meter includes essentially a mechanical-hydraulic transducer with an electric sensing device which can be associated to various metering and/or recording and/or adjusting instruments.

The hydraulic-mechanical transducer includes a hermetically sealed metal housing with two fittings for the inlet and outlet of the fluid the rate-of-flow of which is to be known.

The inlet fitting opens into the inside of the metal housing wherein a differential gauge is mounted, said gauge consisting of a barometric capsule, the outer surface of which is submitted to the higher pressure existing upstream of a choke, while the inner surface is submitted to the lower pressure existing downstream of the choke itself.

The choke consists of a cylindrical annulus embodied at the end of a pipe having a circular cross sectional shape (whereby the fluid enters radially thereinto) the free cross sectional area of which passed through by the fluid, depends upon the shrinking of the barometric bellows.

Thus the choke will have a variable cross sectional area, increasing in function of the differential pressure so as to afford a differential pressure having a relationship almost linear instead of quadratic with the rate-of-flow.

The above device embodies the transducer which transforms into displacements (shrinking of the bellows) the changes of flow of the fluid passing through the choke.

Said displacements are then electrically detected by an electrical mechanical transducer including a piece of high magnetic permeability material rigid with the movable end of the membrane and capable of changing by its to and fro movements, the reluctance offered by the magnetic circuit of an inductor the inductance value of which will change in function of the position of the aforesaid magnetic material piece, and therefore in function of the shrinking or expansion of the barometric bellows which in turn depends upon the rate-of-flow of the fluid passing through the choke.

The variable inductance inductor formed by the shrinking detector of the barometric bellows, is then inserted into a metering electric bridge so that the inductance changes of the transducer will determine an unbalance voltage of the bridge, said voltage being a function of the fluid rate-of-flow within the transducer.

Figure 2:
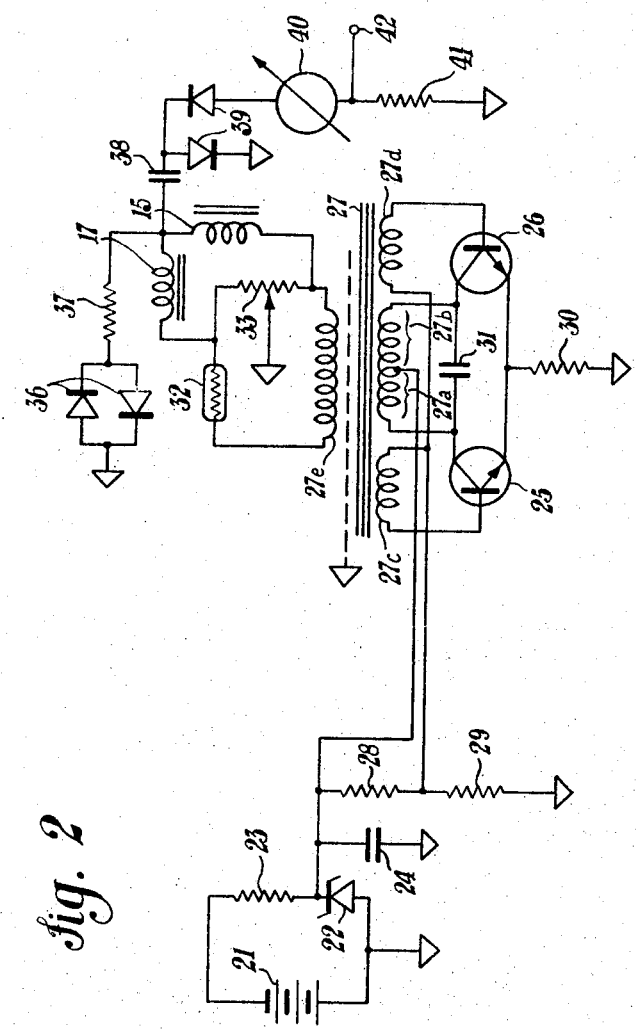

The present invention will be now described with reference to one embodiment thereof, at present preferred, disclosed by way of non-limitative example, and with reference to the attached drawings, wherein:

FIGURE 1 is a cross sectional view of the transducer device for metering the rate-of-flow of fluids, and FIGURE 2 shows the electric diagram of the feeding and metering circuits associated to the transducer of FIGURE 1.

With reference, now, to FIGURE 1, the mechanical-hydraulic transducer includes a pipe 1 which supplies the fluid, the rate-of-flow of which is to be known, into a housing 2 which is hermetically sealed by the cover 3 by means of the packing 4.

The fluid which fills the room 5 passes through the choke 6 entering the duct 7 rigid with the barometric bellows 8, and outflows through the pipe 9 connected to the user device. The choke 6 is provided between the end of the duct 7 and the end of the adjusting member 10 which through the elastic leaf 11 is held to bear against the adjustment screw 12. Thereby, the screw 12 allows the choke 6 to be adjusted to its initial value as necessary for metering the minimum rates-of-flow.

The barometric bellows 8 supports at the base of the duct 7 the annular member 13 rigid with the duct 7 and the membrane 8. The member 13 is made of a ferromagnetic material having high permeability, like the hollow core 14 which receives the winding 15. The core 14 containing the winding 15 is fixed to the support 16 which is screwed to the cover 3 so as to allow the adjustment of the air gap between the member 13 and the pot core 14. Furthermore, the support 16 receives in its upper portion, the inductor 17 received within the pot core 18, held on the support 16 by the expansion ring 19.

The support 16 is suitably apertured at 16a, in order to allow the free flow of the fluid through the choke 6 as shown by the arrows of FIGURE 1. In the cover 3 are received the electrically insulated and hermetically sealed passages 20 for the electric connection of the inductors and of a thermometric resistor (not shown in the figure), which is directly anchored between two of said passages 20. The central hole 14a of the core 14 is so diametered as to allow the free axial displacement of the duct 7 rigid with the membrane 8 of the barometric bellows.

An electric circuit suitable for being used in association with the previously described transducer has been shown in FIGURE 2. As shown in said figure, a direct current source 21 is used for feeding the circuit by a voltage stabilized by means of the Zener diode 22 and the drop resistor 23; a capacitor 24 reduces the internal impedance of the voltage source at the working frequency of the oscillator consisting of the transistors 25 and 26, of the transformer 27 and of the associated components.

The transistors 25 and 26 are used as push-pull oscillator in a circuit having a common emitter; the resistors 28 and 29 form a voltage divider for biassing the bases, while the resistor 30 is used for the temperature stabilization. The transformer 27 is provided with two windings 27a, 27b, serially connected to the collectors of the transistors 25 and 26, with two windings 27c, 27d serially connected to the bases of the same transistors and with a screened winding 27e, the voltage of which feeds the metering bridge including the windings 15 and 17 of the transducer and the potentiometer 33 through the thermometric resistor 32. The capacitor 31 in parallel to the winding connected to the collectors of the transistors 25 and 26, allows the desired oscillation frequency to be obtained.

If a resistor having a suitable value with a negative temperature coefficient will be used as thermometric resistor 32, the voltage at the ends of the bridge will increase with the increase of the fluid temperature, the density of said fluid decreasing with the increase of the temperature. Thus, the reduced change of inductance in the variable inductor of the transducer determines an unbalance voltage of the bridge equal to that corresponding to a greater change of inductance with a lower temperature of the fluid.

The metering bridge includes a balancing potentiometer 33 and the inductors 14 and 15 of the transducer. The potentiometer is adjusted so as to have no bridge unbalance for a zero value of the rate-of-flow. The unbalance voltage of the bridge, which is a function of the fluid rate-of-flow, is applied through the capacitor 38 to the metering circuit consisting of the rectifiers 39, of the display instrument 40 and of the resistor 41. At the ends of the resistor 41, i.e. at the terminal 42 a voltage is available which is a function of the flow-of-rate and which can be sent to suitable recording and/or remote transmission systems.

Furthermore, the unbalance voltage of the bridge is applied to the diodes 36 anti-parallel and serially connected to the resistor 37. This circuit allows, when needed, the increasing values to be compressed, and by suitably selecting their Zener voltage value and the value of the resistor 37, it will be possible to make the total response characteristic $V=f(Q)$ of a logarithmic type, so that the display instrument 40 will allow an equal metering percent precision to be obtained at the high and low values of the rate-of-flow.

Due to the combination of the characteristic of the mechanical displacement in function of the hydraulic rate-of-flow, which is almost linear and of the characteristic of the unbalance voltage of the bridge in function of the mechanical displacement of the air gap, an initial characteristic already strictly near to the logarithmic characteristic of the $V=f(Q)$ will be obtained. The logarithmic feature of the curve will be then maintained at the elevated values of (Q) by the effect of the described circuits.

As the inductance is an inverse function of the air gap taking the shape $L=A/(B+t)$ (where L is the inductance, A is a dimensional constant of the inductor, B is a physical dimensional constant of the inductor core, and $t$ is the width of the air gap) the detecting inductor is embodied with a low inductance in the absence of the air gap, so that very great changes of inductance will be obtained for little changes of the air gap.

As aforesaid, the inductor is inserted in that branch of the bridge which will be zeroed as the minimum air gap corresponding to a nul rate-of-flow. The bridge will be fed with alternating current having suitable frequency and voltage as aforesaid and this will be controlled by the characteristics of the oscillating circuit embodied on the transformer.

The present invention has been described with reference to an embodiment at present preferred, but it will be understood that changes and modifications could be brought thereto without departing from the scope of the present industrial privilege.

I claim:

1. A transducer for metering the instantaneous rate-of-flow of fluids with a broad dynamics of response comprising in combination a hermetically sealed metal housing having on its lower wall an inlet pipe and an outlet pipe, a barometric bellows having an input opening and an output opening arranged within said housing, said output opening being rigidly secured to said output pipe, a duct connected at one end to said inlet opening, a support screwed to the inner wall of said housing above said bellows and having apertures to allow the fluid passage from the inlet pipe and provided with a tubular projection having openings at a level corresponding to the upper end of said duct partially entering into said projection, and annular variable inductance transducer arranged within said tubular projection, an adjusting member elastically arranged within said inductance transducer to act as a choke between said duct and said adjusting member, a screw passing through the upper wall of said housing and acting on said adjusting member, whereby the inner and outer surface of said bellows are submitted to the differential pressure existing upstream and downstream of said choke, the aperture of which changes with the deformation of said barometric bellows.

2. A transducer as claimed in claim 1, wherein said annular inductance transducer comprises a first inductor, an inductor core provided around said duct, a ferromagnetic annular member rigid with the lower end of said duct to form an air-gap with said inductor core variable with the deflection of said barometric bellows, said inductor being associated with a read-out circuit comprising an electric bridge having an inductive part rendered symmetrical by including a second inductor having a core arranged around said adjusting member within said tubular projection and having characteristics similar to those of said first inductor.

3. A transducer as claimed in claim 2 wherein said electric bridge includes an element for compensating the changes of the density of the fluid, produced by the changes of temperature, comprising a resistor having a resistance coefficient variable with the temperature, contacting the fluid adjacent said barometric bellows and inserted in said circuit to alter the electric bridge feeding currents in order to annul the effect of the changes of density of the fluid due to changes of the temperature.

References Cited

UNITED STATES PATENTS

| 1,416,220 | 5/1922 | Long et al. | 73—210 |
| 1,677,411 | 7/1928 | Scoville | 73—208 |
| 3,234,790 | 2/1966 | Ekstrom | 73—210 |

FOREIGN PATENTS

| 349,723 | 6/1937 | Italy. |
| 758,023 | 9/1956 | Great Britain. |

RICHARD C. QUEISSER, *Primary Examiner.*

E. D. GILHOOLY, *Assistant Examiner.*